(12) United States Patent
Thompson

(10) Patent No.: US 9,254,587 B1
(45) Date of Patent: Feb. 9, 2016

(54) MODULAR ENDPLATE FOR PRESTRESSED PRECAST CONCRETE PRODUCTS

(71) Applicant: Craig K. Thompson, Marietta, GA (US)

(72) Inventor: Craig K. Thompson, Marietta, GA (US)

( * ) Notice: Subject to any disclaimer, the term of this patent is extended or adjusted under 35 U.S.C. 154(b) by 432 days.

(21) Appl. No.: 13/897,892

(22) Filed: May 20, 2013

Related U.S. Application Data

(60) Provisional application No. 61/688,601, filed on May 18, 2012.

(51) Int. Cl.
*B28B 23/04* (2006.01)
*B29C 39/22* (2006.01)

(52) U.S. Cl.
CPC ..................................... *B29C 39/22* (2013.01)

(58) Field of Classification Search
CPC ...... B28B 23/026; B28B 23/04; B28B 23/043
See application file for complete search history.

(56) References Cited

U.S. PATENT DOCUMENTS

| | | | | |
|---|---|---|---|---|
| 2,394,227 A * | 2/1946 | Barber | ..................... | B28B 15/00 264/228 |
| 2,397,728 A * | 4/1946 | Dowsett | ................ | B28B 23/026 249/50 |
| 2,556,928 A * | 6/1951 | Ludlow | ................. | B28B 11/242 249/97 |
| 2,614,801 A * | 10/1952 | Mazzei | ................. | B28B 23/043 140/105 |
| 2,637,895 A * | 5/1953 | Blaton | .................. | B28B 23/043 254/29 A |
| 3,070,867 A * | 1/1963 | Belle | ..................... | B28B 23/026 249/187.1 |
| 3,084,910 A * | 4/1963 | Allers | ................... | B28B 23/043 249/33 |
| 3,202,394 A * | 8/1965 | Shoe | ..................... | B28B 23/024 249/94 |
| 4,051,216 A * | 9/1977 | Bratchell | ................ | B28B 11/16 264/157 |
| 5,747,074 A * | 5/1998 | Ollendick | ............. | B28B 23/043 249/86 |

\* cited by examiner

*Primary Examiner* — James Sanders
(74) *Attorney, Agent, or Firm* — Rodgers & Rodgers

(57) ABSTRACT

A modular endplate for prestressed precast concrete products comprising multiple clamps vertically disposed in an abutting relationship with the adjacent clamp, a T-shaped top disposed above the clamps and multiple steel strands extending through the endplate.

11 Claims, 5 Drawing Sheets

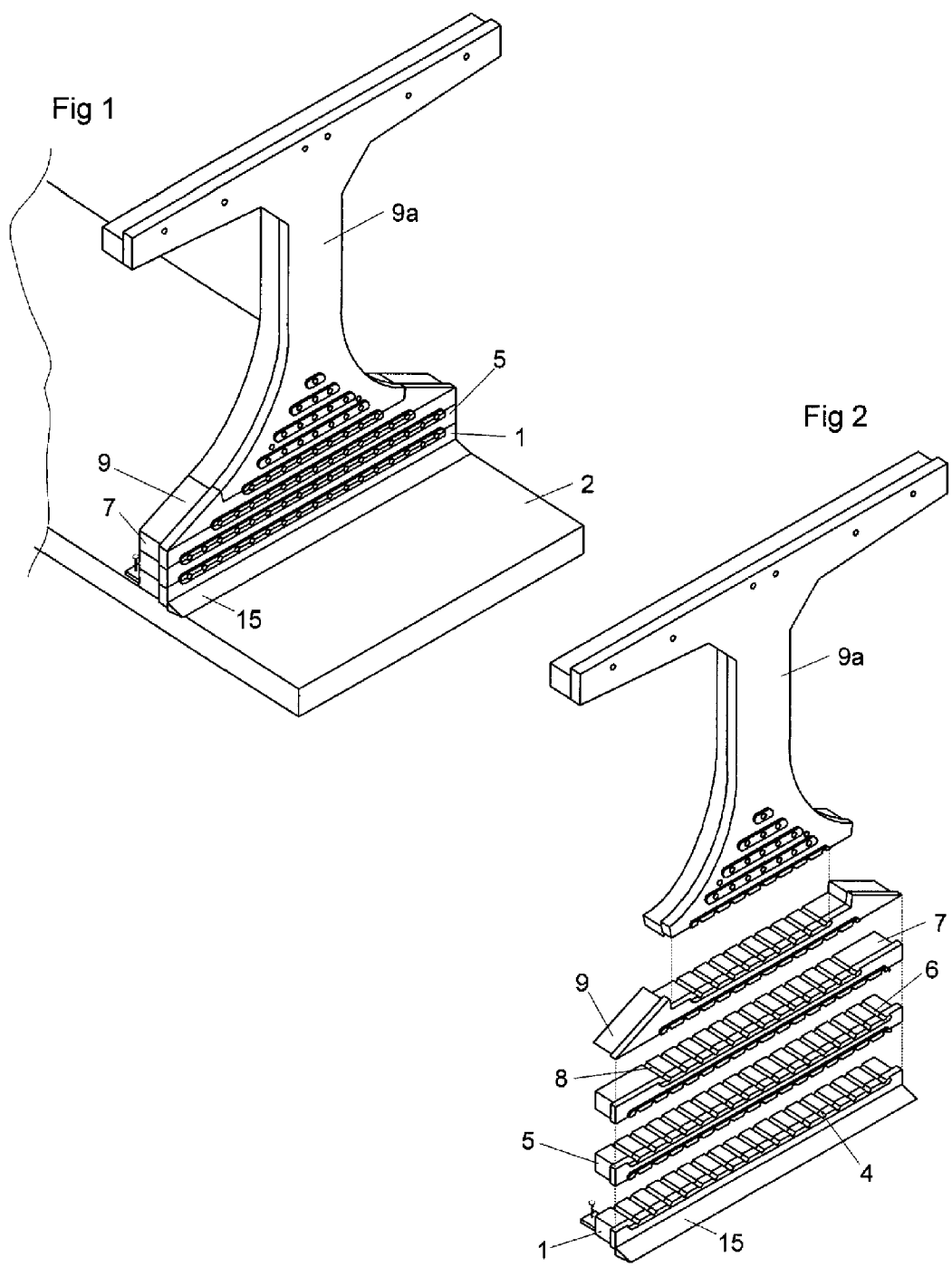

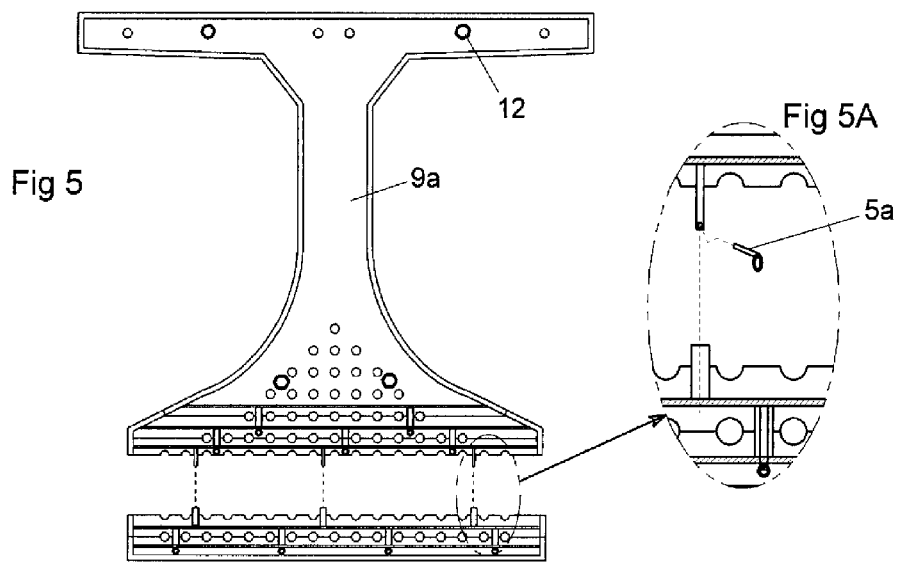
Fig 5
Fig 5A
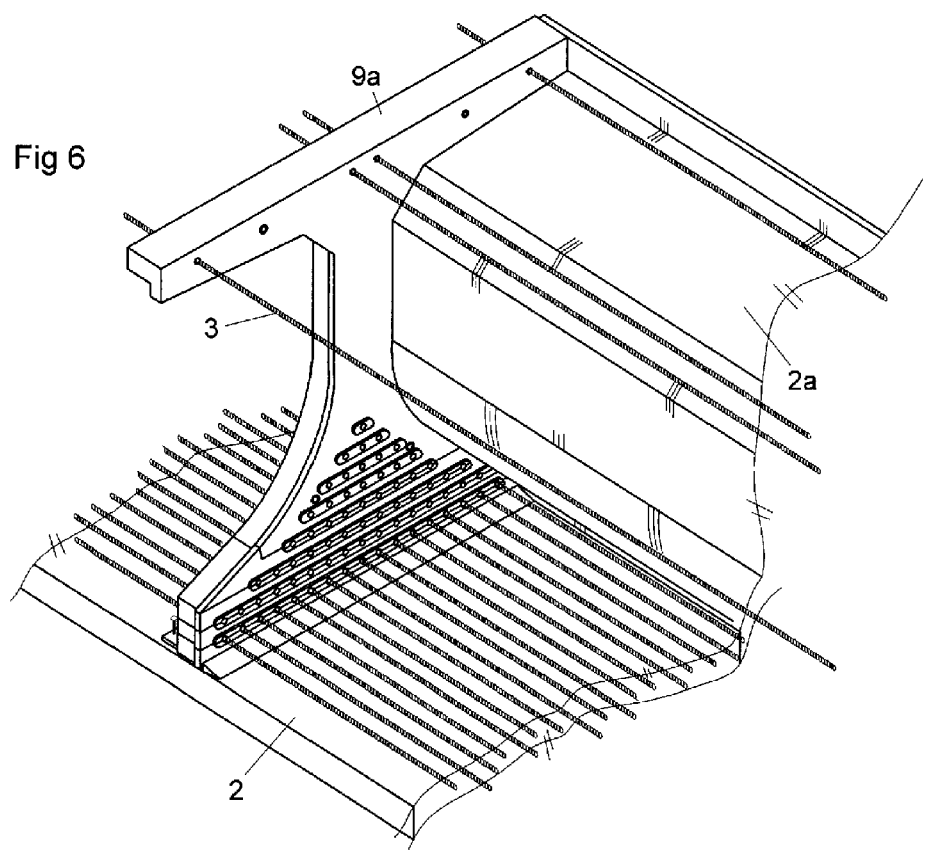
Fig 6

MODULAR ENDPLATE FOR PRESTRESSED PRECAST CONCRETE PRODUCTS

The benefits under 35 U.S.C. 119 are claimed of U.S. provisional patent application 61/688,601 filed May 18, 2012.

BACKGROUND OF THE INVENTION

Certain precast concrete products are produced using prestressing where high-strength steel tendons or strands are stretched between fixed points utilizing a calibrated tensioning mechanism. Concrete is then carefully placed and consolidated around the tendons. After the concrete hardens, forms are removed and the tendons are slowly detensioned thereby transferring the prestressing forces within the tendons to the concrete itself. The concrete is therefore compressed giving it much greater load-bearing capacity than nonprestressed units of the same configuration.

Types of structures which are currently built using prestressed products include bridges, stadiums, parking garages, warehouses and high rise buildings. Prestressed manufactured concrete is available in a wide variety of cross-sectional shapes. Types of precast concrete products which are produced using this technique are beams, bulb-tees, piling, double tees, inverted tee beams and columns. The applications where prestressed precast concrete is a viable option will undoubtedly increase, due to price increases of competing products like structural steel.

Prestressed concrete products are increasingly being designed with higher concrete strengths and greater quantities of tendons. This development has allowed greater product lengths, which both reduces overall construction costs and shrinks the time required to complete a project. Since both of these end results are very important to owners, concrete strengths and tendon densities continue to increase. Recent technological developments, like self-consolidating concrete, have given prestressed concrete producers the confidence to aggressively pursue these more demanding projects, taking away market share from competing products.

Prestressed concrete products are typically cast end to end in beds ranging from 200' to 600' in length. A full-length soffit forms the underside of the product and removable side forms give the proper shape to the product's sides. Endplates or headers form the ends. Side forms are pulled tightly against the soffit to eliminate grout leaks and are kept the proper distance apart at the top using crossties.

Endplates form the end of a single prestressed member. Constructed out of steel or plywood, solid endplates function similarly. Steel endplates are more expensive than plywood, but can last for years, whereas inexpensive plywood endplates may only last two to five pours. In order to shorten the cycle time and reduce labor costs, some producers have chosen to use three-piece slotted endplates. Slotted endplates allow a producer to tension the bottom flange strands before locating endplates on the bed, shortening the production cycle. The end of the resulting beam is ragged, however, and may require labor intensive remedial work before it can be shipped.

SUMMARY OF THE INVENTION

According to this invention, production begins with a clean and uncluttered soffit. Solid endplates are positioned properly on the soffit and clamped down. If six individual products will be cast in the production run, twelve endplates are required. The distance between endplates is critical, as it determines the length of the finished piece. With the endplates in place, the strand pulling operation begins.

A group of tendons (9-17 strands) are machine pulled up to an endplate. The tendons are then threaded, one by one, through the respective holes in the endplate. Usually there is a second endplate positioned a few feet away, so the tendons are passed through another set of holes. With both endplates cleared, the group of tendons can then be machine pulled to the next endplate location, where the process repeats. Care must be taken in the strand pulling operation to avoid having crossed or improperly positioned tendons. Even though multiple tendons are pulled by machine, a great deal of time is spent having to stop the strand pulling operation at each pair of endplates.

Once the tendons are in position, the stressing operation begins. A calibrated hydraulic cylinder is used to place 35,000 to 50,000 lbs of tension on each tendon. Producers follow a particular stressing sequence. After all the tendons are stressed, the next step consists of properly locating and fastening such components as rebar, inserts, and block-outs. These components are tied either to the tensioned strands or rebar to eliminate shifting during the concrete pouring operation. Quality control personnel then perform a pre-pour check.

The production process continues with the producer setting side forms, then pouring concrete. The producer is permitted to cut down or detension the bed when the concrete reaches a specific release strength. The final step consists of removing the individual prestressed products to an intermediate finishing area, where they undergo a second quality control inspection which is the post-pour check. The bed is then restored to its clean, uncluttered condition and the next production cycle begins.

This invention allows producers to machine pull strand in a continuous fashion without having to stop and hand thread individual tendons through endplate holes. The time spent by production personnel placing strand in the bed can easily be decreased by 50% to 75%. Due to several innovative optional features, this invention achieves additional cost reductions in finishing expense.

Whether modular endplates are being used to cast slab beams, box beams, I-beams, bulb-tees, double tees, piling or some other form of prestressed member, the invention incorporates two fundamental concepts. The first revolves around splitting the modules horizontally at the specific elevations where each layer of strand occurs. The second fundamental concept revolves around the elimination of any movement once each module interlocks with the lower structure. This is critical for producing products of the same or better quality as produced using solid steel endplates. Current practice is that locking is best with a pipe and post system combined with quick-release pins.

BRIEF DESCRIPTION OF THE SEVERAL VIEWS OF THE DRAWINGS

FIG. 1 is a perspective view of a modular endplate according to this invention resting on the soffit;

FIG. 2 is an exploded perspective view of the endplate shown in FIG. 1;

FIG. 5 is a partially exploded end elevational view;

FIG. 5A is an end elevational view of a section of the endplate shown in FIG. 5;

FIG. 6 is a perspective view showing one layer of bottom flange strands;

FIGS. 7A and 7B are perspective views of portions of the beam end shown in FIG. 7.

DETAILED DESCRIPTION OF THE INVENTION

Figure 3:
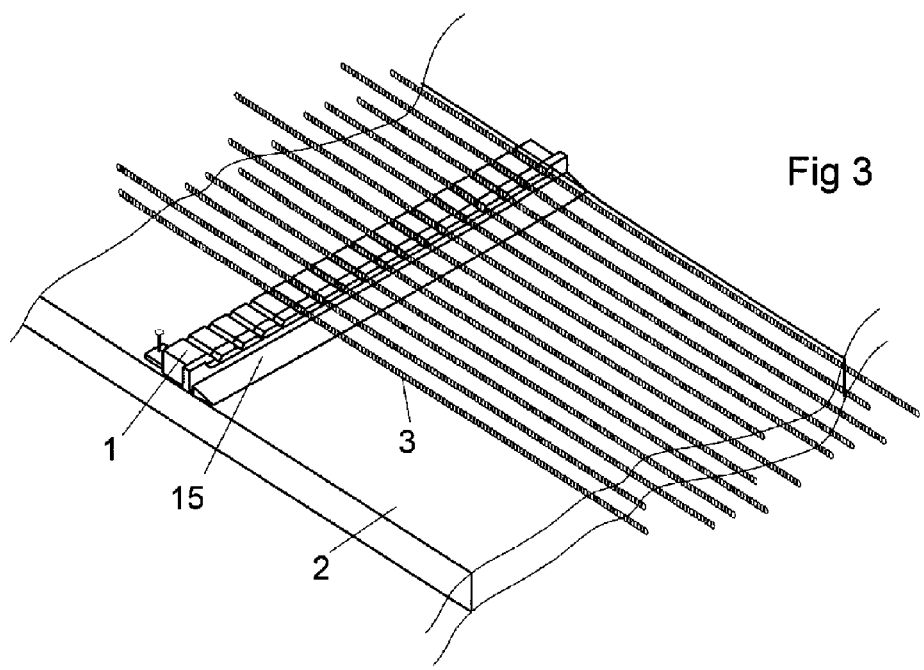
FIGS. 3 and 4 are partial perspective views of the endplate during stages of operation.
Figure 4:
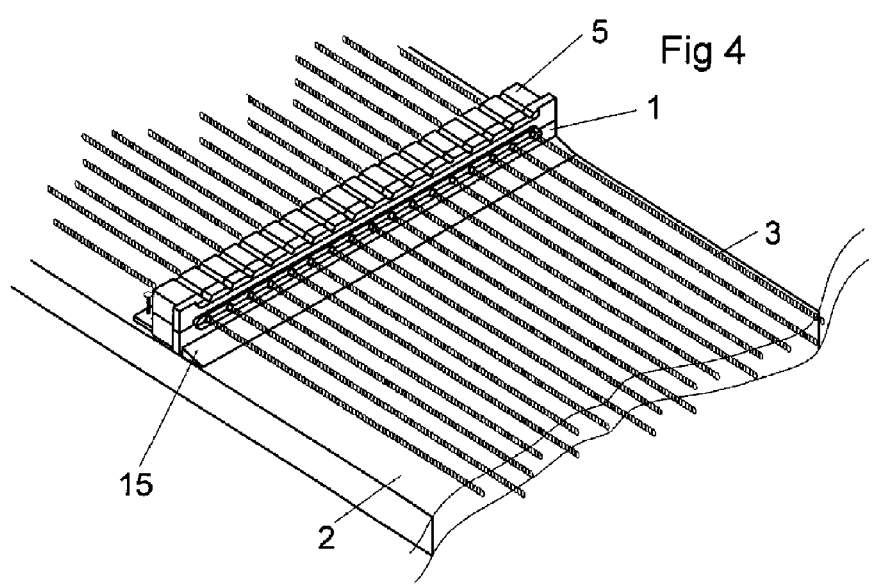
Figure 7:
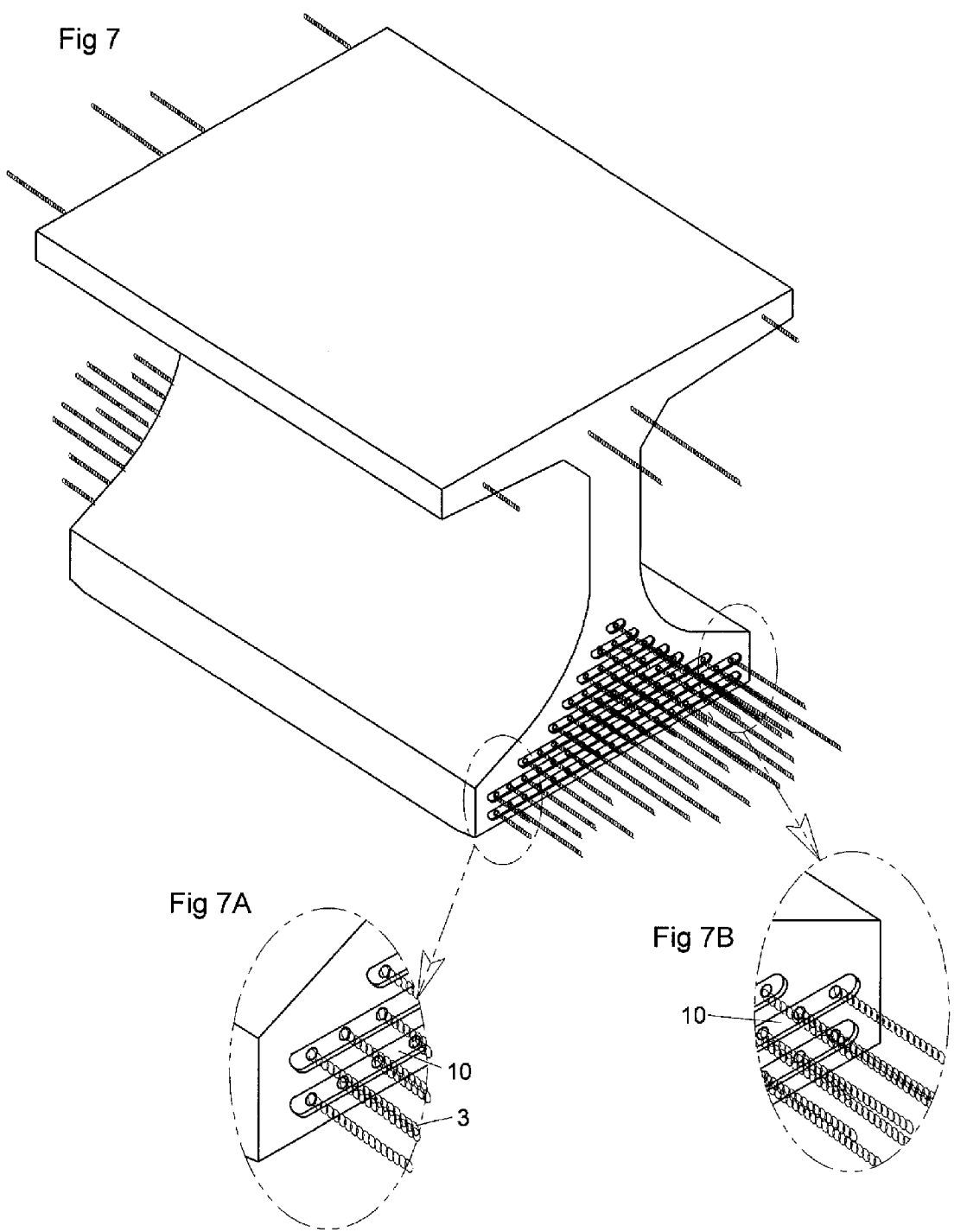
FIG. 7 is a perspective view of a prestressed beam with a full complement of strands prior to detensioning.
Figure 8:
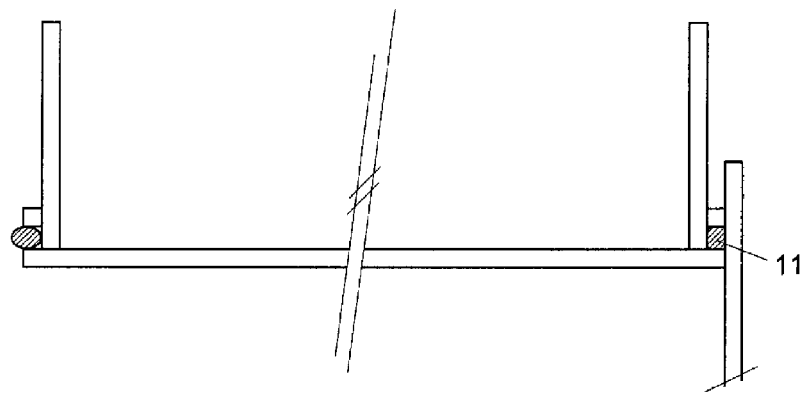
FIGS. 8, 9 and 10 depict enhancements of the endplate design according to this invention.
Figure 9:
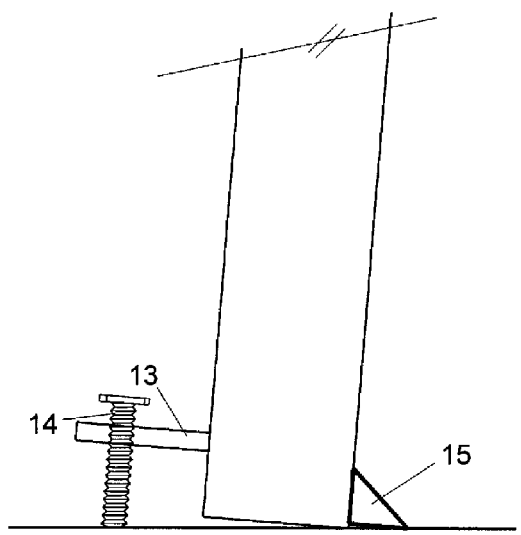
Figure 10:
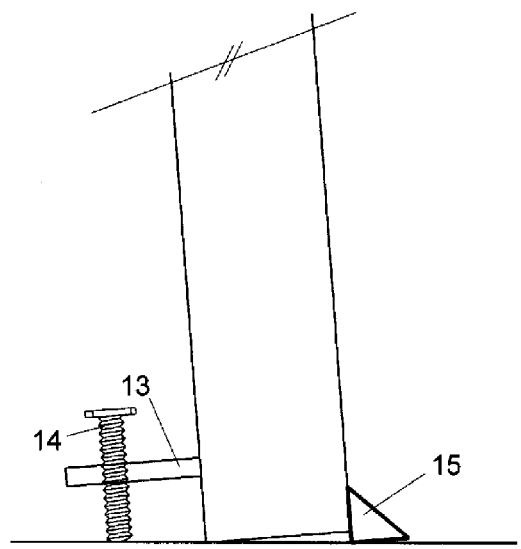

With reference to FIG. 1, the first step involved in forming the modular endplate, according to this invention, includes precisely positioning base clamp 1 on soffit 2. Base 1 is rigidly attached to soffit 2 using C-clamps or self-tapping screws. Side forms 2a extend upwardly from both sides of soffit 2.

Then, a lift truck or winch is used to quickly pull seventeen strands 3 from one end of the bed to the other. Workers carefully position strands 3 in half moon cutouts 4 of base clamp 1 and then quickly lower middle clamp 5 into place, positively locking the two clamps together using quick release pins 5a so that undesirable movement is prevented. By means of a lift truck or winch, a second uninterrupted pull of seventeen strands 3 is completed whereby strands 3 are placed in half moon cutouts 6 disposed along the upper edge of middle clamp 5. Following this, upper clamp 7 is lowered and locked onto the two lower clamps. A third pulling of thirteen strands 3 is positioned onto cutouts 8 disposed on the upper edge of upper clamp 7. Then top clamp 9 with appropriate half moon cutouts formed on the upper edge thereof is lowered and rigidly fixed onto the underlying structure. To complete the basic elements of the modular endplate, T-shaped top 9a is positioned on top clamp 9. Corresponding half moon cutouts are formed on the bottom edges of clamps 5, 7 and 9 and T-shaped top 9a so that strands 3 are fully secured in position.

At this point, the modular endplate consists of a rigid, six-part structure which has the cross-sectional shape of a bulb tee girder. Usually there are no more than four additional top flange strands which the producer adds by traditional methods. With all strands present and located correctly, the production process then proceeds as usual.

In some regions, producers are required to create grooves 10 in the ends of the bridge beams to allow for extra depth to receive an epoxy covering. The epoxy, applied over the prestressed tendons, provides an extra measure of corrosion protection. Traditionally, these grooves have been cut by hand using a gasoline powered concrete saw. Fatigue and heat can cause the saw operator to slip with potentially disastrous results. Beyond the inherent danger to the saw operator, this step in the production process is labor intensive and subjects the saw operator to a great deal of harmful concrete dust. Milling grooves in the steel face of the modular endplate eliminates this dangerous and labor intensive step.

The surface of the modular endplate that comes into contact with the concrete is shaped so that the concrete is precisely recessed around strands 3. This recessed formed area holds the extra depth of epoxy necessary and serves the same purpose as manually sawcutting grooves in the beam ends. A producer's labor costs and exposure to risk are, therefore, significantly reduced.

With many producers adopting self-consolidating concrete, there is a need for grout-tight forming systems. Adding gaskets 11 to the sides of the modular endplates allows producers to virtually eliminate grout leaks and the potential for honeycombs. The most sensitive and congested part of a prestressed product is the bearing zone at the ends where its weight is supported.

Producers may want to have the ability to push their modular endplates away from the cured concrete by advancing coil bolts 12 through nuts (not shown) welded to the back of T-shaped top 9a. Coil bolts 12 advance through the form face and bear again the hardened concrete. As coil bolts 12 are rotated, the modular endplate is pushed away from the end of the concrete product in a very controlled fashion. This saves wear and tear on the modular endplate and eliminates concrete spalling which can occur when prying endplates off beam ends.

Many times, prestressed beams and girders are required to have batter. Batter refers to the tilt of the beam's end. A beam with vertical ends is said to have no batter. Batter angles typically range from plus or minus 4.5 degrees. The modular endplate design can accommodate batter by means of two gusseted tabs 13 projecting on either side at the bottom of the endplate. Gusseted tabs 13 are drilled and tapped to receive adjustment bolts 14. Adjusting bolts 14 changes the angle of repose of the modular endplate. Once the endplate is adjusted for batter and clamped to soffit 2, the remaining modules rigidly lock together thereby maintaining the proper batter angle.

Mitering edges of concrete products by means of triangular chamfer 15 eliminates damage which occurs after the prestressed concrete member reaches its release strength. A large chamfer 15 is typically used at the ends of bridge beams and girders to eliminate damage resulting from the detensioning process. Since the ends of bridge beams and girders are frequently battered, any chamfer attached to the endplate must be able to slide down when the modular endplate is tilted backwards, and slide up when the modular endplate is tilted forward. Recessing powerful magnets flush with the form face of the endplate allows the chamfer to move up and down as appropriate while adhering properly to the endplate.

Therefore, by this invention, a very significant leap forward is offered to manufacturers of prestressed precast concrete. In its simplest form, it allows producers to dramatically decrease the labor costs of preparing a casting bed prior to the stressing operation. Due to its rigidity and interlocking design that prohibits any motion of the modules, modular endplates allow producers to gain significant cost reductions and increased productivity with no decrease in quality.

The invention claimed is:

1. A modular endplate for concrete products comprising a base clamp having an upper edge, half moon cutouts formed on said upper edge, a top clamp having a bottom edge, said half moon cutouts formed on said bottom edge, and said upper edge being in face contacting relation with said bottom edge;
   wherein a T-shaped top having half moon cutouts formed on a bottom edge is disposed on said top clamp, the modular endplate having the cross-sectional shape of a bulb tee girder.

2. The modular endplate according to claim 1 wherein a middle clamp is interposed between said top clamp and said base clamp.

3. The modular endplate according to claim 2 wherein an upper clamp is interposed between said top clamp and said middle clamp.

4. The modular endplate according to claim 1 wherein steel strands are positioned in said half moon cutouts formed on said upper edge.

5. The modular endplate according to claim 2 wherein steel strands extend between said top clamp and said middle clamp and between said middle clamp and said base clamp.

6. The modular endplate according to claim 1 wherein coil bolts extend through the upper portion of said T-shaped top.

7. The modular endplate according to claim 1 wherein grooves are formed in said endplate adjacent said half moon cutouts.

8. The modular endplate according to claim 1 wherein a chamfer is slidably secured to the lower portion of said endplate.

9. The modular endplate according to claim 8 wherein said chamfer is magnetically secured to said endplate.

10. The modular endplate according to claim 1 wherein a gusseted tab projects outwardly from said endplate.

11. The modular endplate according to claim 10 wherein an adjustment bolt is threadably interconnected to said gusseted tab.

\* \* \* \* \*